(12) United States Patent
Fukumoto et al.

(10) Patent No.: US 9,476,496 B2
(45) Date of Patent: Oct. 25, 2016

(54) DRIVING APPARATUS FOR VEHICLE

(71) Applicant: AISIN SEIKI KABUSHIKI KAISHA, Kariya-shi, Aichi-ken (JP)

(72) Inventors: Ryoichi Fukumoto, Nagoya (JP); Shigeyuki Suzuki, Kariya (JP); Hidefumi Katayama, Anjo (JP); Katsumi Chono, Hekinan (JP); Takuya Kotani, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 487 days.

(21) Appl. No.: 14/134,273

(22) Filed: Dec. 19, 2013

(65) Prior Publication Data

US 2014/0179475 A1 Jun. 26, 2014

(30) Foreign Application Priority Data

Dec. 25, 2012 (JP) ................................. 2012-281576

(51) Int. Cl.
  *E05F 11/48* (2006.01)
  *F16H 55/36* (2006.01)
  *F16H 7/20* (2006.01)

(52) U.S. Cl.
  CPC ............. *F16H 55/36* (2013.01); *E05F 11/483* (2013.01); *F16H 7/20* (2013.01); *E05Y 2201/668* (2013.01); *E05Y 2900/55* (2013.01)

(58) Field of Classification Search
  CPC ..... E05F 11/483; E05F 11/488; F16H 55/36; F16H 7/20; E05Y 2201/668; F16B 21/125
  USPC ..................... 49/352; 474/166, 174
  See application file for complete search history.

(56) References Cited

U.S. PATENT DOCUMENTS

| | | | | |
|---|---|---|---|---|
| 3,750,489 A | * | 8/1973 | Caldwell | F16D 1/06 403/261 |
| 4,034,616 A | * | 7/1977 | Rauscher | F16H 55/48 474/174 |
| 4,593,431 A | * | 6/1986 | Sandberg | E05D 15/44 16/381 |
| 5,333,411 A | | 8/1994 | Tschirschwitz et al. | |
| 5,920,959 A | * | 7/1999 | DeMarco | E05D 7/1022 16/257 |
| 6,088,965 A | | 7/2000 | Fukumoto et al. | |
| 9,028,352 B2 | * | 5/2015 | Wilson | F16C 13/006 29/525.01 |

(Continued)

FOREIGN PATENT DOCUMENTS

| | | |
|---|---|---|
| DE | 10 2008 058 906 | 5/2010 |
| DE | 20 2010 002 223 | 7/2011 |

(Continued)

*Primary Examiner* — Robert Canfield
(74) *Attorney, Agent, or Firm* — Finnegan, Henderson, Farabow, Garrett & Dunner, LLP

(57) ABSTRACT

A driving apparatus for a vehicle includes a rotation member, as support pin including a flange for stopping a movement of the rotation member in one axial direction and a circumferential groove formed at an end portion that penetrates through the rotation member, an annular elastic member supported relative to the circumferential groove and configured to reduce a diameter in a radial direction, and a support member including an attachment hole in which the end portion of the support pin is idly provided, the support member including an inwardly protruding flange provided at the attaching hole and having an inner diameter equal to or greater than an outer diameter of the annular elastic member when the annular elastic member is in an elastically deformed state having reduced diameter and smaller than the outer diameter of the annular elastic member when the annular elastic member is in an elastic recovery state.

5 Claims, 4 Drawing Sheets

(56) References Cited

U.S. PATENT DOCUMENTS

| | | | | |
|---|---|---|---|---|
| 2009/0188167 | A1* | 7/2009 | Maruyama | E05F 11/483 49/347 |
| 2010/0119295 | A1* | 5/2010 | Renke | E05F 11/483 403/14 |
| 2011/0111900 | A1* | 5/2011 | Wilson | F16C 13/006 474/166 |
| 2014/0165471 | A1* | 6/2014 | Chono | B60J 1/17 49/352 |
| 2015/0191957 | A1* | 7/2015 | Takeda | E05F 11/483 49/352 |
| 2015/0275560 | A1* | 10/2015 | Yamamoto | E05F 11/488 49/352 |

FOREIGN PATENT DOCUMENTS

| | | | | |
|---|---|---|---|---|
| EP | 2749723 A2 * | 7/2014 | | E05F 11/483 |
| JP | 53-48988 | 9/1951 | | |
| JP | 3332803 | 7/2002 | | |
| JP | 2006-322516 A | 11/2006 | | |
| WO | WO 2015198849 A1 * | 12/2015 | | B60J 1/17 |

* cited by examiner

DRIVING APPARATUS FOR VEHICLE

CROSS REFERENCE TO RELATED APPLICATIONS

This application is based on and claims priority under 35 U.S.C. §119 to Japanese Patent Application 2012-281576, filed on Dec. 25, 2012, the entire content of which is incorporated herein by reference.

TECHNICAL FIELD

This disclosure generally relates to a driving apparatus for a vehicle.

BACKGROUND DISCUSSION

A known driving apparatus for a vehicle is disclosed in DE20 2010 002 223U1 (hereinafter referred to as Patent reference 1). As illustrated in FIG. 7, the known driving apparatus disclosed in Patent reference 1 includes a pulley sub-assembly 90. The pulley sub-assembly 90 includes a pulley 91, a support pin 92 inserted to be positioned through the pulley 91 and including a flange 92a stopping a movement of the pulley 91 in one direction in an axial direction, thereby to pivotally support the pulley 91, and a pulley bracket 93 secured to the support pin 92 and stopping a movement of the pulley 91 in the other direction in the axial direction. The pulley sub-assembly 90 is attached to an attachment portion 96 formed on a support member 95 and formed in a substantially truncated cone shape having a bottom.

That is, the pulley sub-assembly 90 is attached to the attachment portion 96 to be supported by the support member 95 by hooking an end 93a of an outer periphery portion of the pulley sub-assembly 90 (outer periphery portion of the pulley bracket 93) at a retainer portion 97 formed at the support member 95 and by press-fitting the other end 93b of the outer periphery portion into the attachment portion 96 with the retainer portion 97 as a fulcrum.

According to the construction disclosed in Patent reference 1, an assembling direction of the support pin 92 inserted through the pulley 91 is arranged in an axial direction of the pulley 91, and an assembling direction of the pulley sub-assembly 90 to be supported by the support member 95 (attachment portion 96) is a combination of a linear direction in the axial direction of the pulley 91 in a state where the pulley sub-assembly 90 is tilted relative to the axial direction of the attachment portion 90 and a rotational direction with the retainer portion 97 as the fulcrum. Thus, the plural assembling directions exist (the assembling direction is not one direction), which increases assembly time.

A need thus exists for a driving apparatus for a vehicle which is net susceptible to the drawback mentioned above.

SUMMARY

In light of the foregoing, the disclosure provides a driving apparatus for a vehicle, which includes a rotation member on which a rope member for transmitting a driving force of a drive source is hooked, a support pin being inserted into the rotation member along an axial direction of the rotation member, including a flange for stopping a movement of the rotation member in one direction in the axial direction, including a circumferential groove formed at an end portion that penetrates through the rotation member, the support pin rotatably supporting the rotation member, an annular elastic member supported relative to the circumferential groove, the annular elastic member configured to reduce a diameter in a radial direction, and a support member including en attachment hole in which the end portion of the support pin that penetrates through the rotation member is idly provided, the support member including an inwardly protruding flange provided at the attaching hole to protrude at a position closer to the flange than the annular elastic member in an axial direction, the inwardly protruding flange having an inner diameter equal to or greater than an outer diameter of the annular elastic member when the annular elastic member is in an elastically deformed state having reduced diameter within the circumferential groove and smaller than the outer diameter of the annular elastic member when the annular elastic member is in an elastic recovery state where the diameter expands.

BRIEF DESCRIPTION OF THE DRAWINGS

The foregoing and additional features and characteristics of this disclosure will became more apparent from the following detailed description considered with the reference to the accompanying drawings, wherein.

DETAILED DESCRIPTION

One embodiment of the driving apparatus for the vehicle will be explained as follows referring to illustrations of drawing figures. The disclosure is, for example, applied to a window regulator for a vehicle, for example, an automobile.

Figure 6:
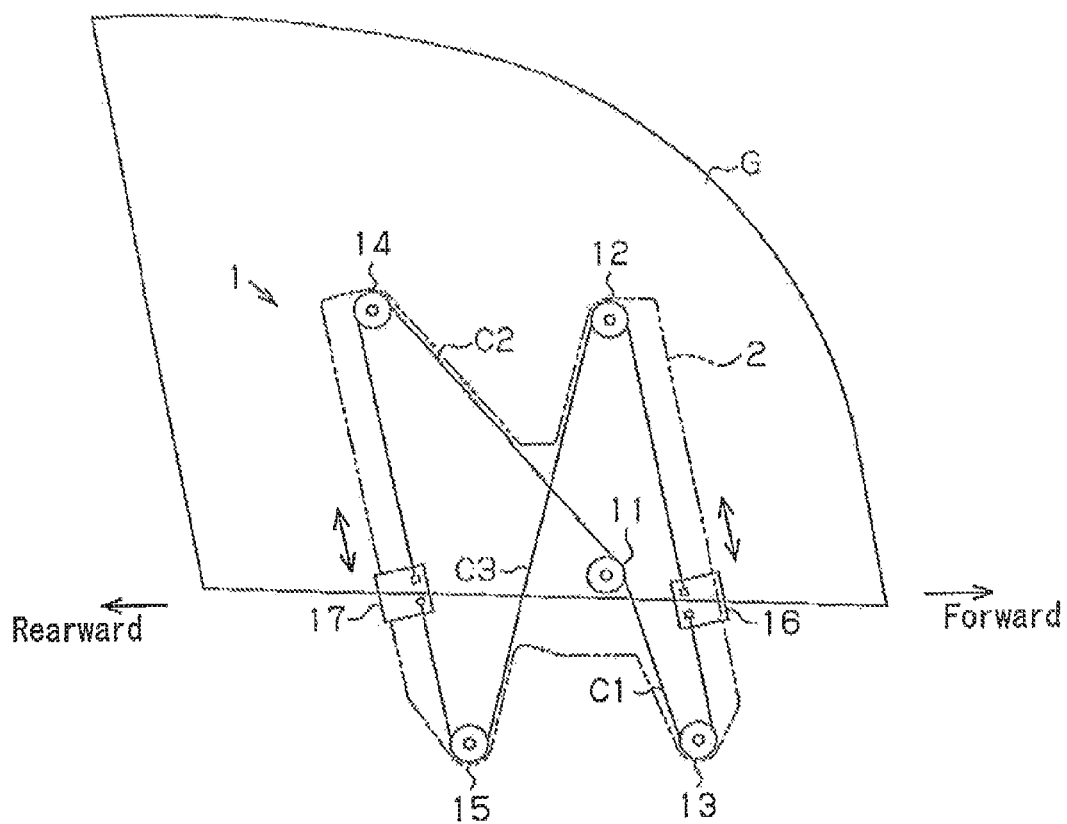
FIG. 6 is a schematic view of a window regulator apparatus according to the embodiment disclosed here.
Figure 7:
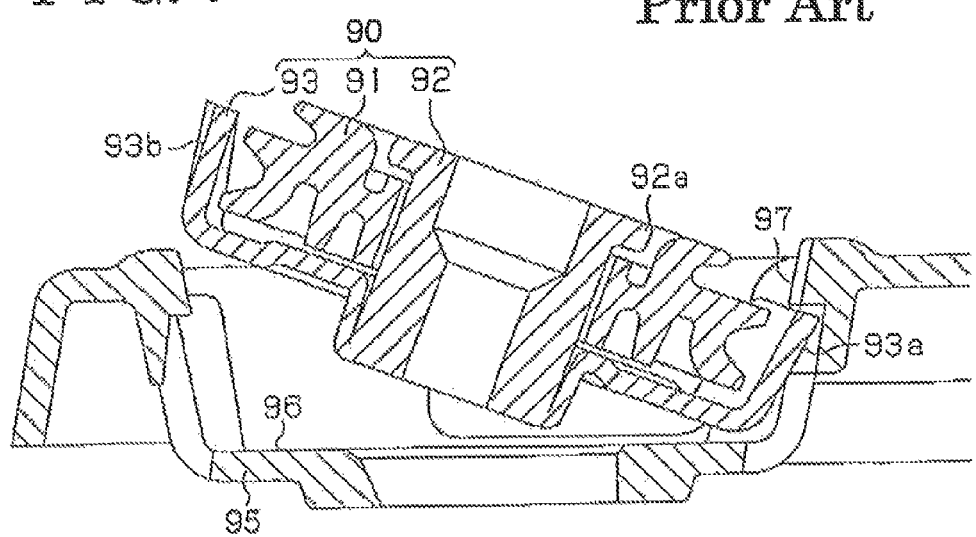
FIG. 7 is a cross-sectional view of a known construction.

As illustrated in FIG. 6, a window regulator apparatus 1 includes a support member 2 which is, for example, made of resin and formed in a substantially H-shape. The window regulator apparatus 1 is mounted within a vehicle door where the support member 2 is positioned below a window frame. A drum 11 is rotatably supported at a center portion of the support member 2. Front pulleys 12, 13 each serving as a rotation member are rotatably supported at an upper end portion and a lower end portion, respectively, of the support member 2 at a frontward of the vehicle. Rear pulleys 14, 15 each serving as a rotation member are rotatably supported at an upper end portion and a lower end portion, respectively, of the support member 2 at a rearward of the vehicle.

A front guide 16 is attached to the support member 2 so as to be movable in a substantially upward-downward direction along a front rim portion. A rear guide 17 is attached to the support member 2 so as to be movable in a substantially upward-downward direction along a rear rim portion. Moving directions of the front guide 16 and the rear guide 17 are in parallel with each other. The front guide 16 and the rear guide 17 are fixed to and support a lower rim portion of a window pane G. Thus, the window pane G moves upward and downward in response to the movement of the front guide 16 and the rear guide 17 in the substantially upward-downward direction along the support member 2.

A first cable C1 serving as a rope member one end of which being engaged with the drum 11 extends towards the front pulley 13 in a downwardly forward direction, is hooked at the front pulley 13 to extend in an upwardly rearward direction, and the other end of the first cable C1 is engaged with the front guide 16. Similarly, a second cable C2 serving as a rope member one end of which being engaged with the drum 11 extends in an upwardly rearward direction towards the rear pulley 14, is hooked at the rear pulley 14 to extends in a downwardly forward direction, and the other end of the second cable C2 is engaged with the rear guide 17. The first and second cables C1, C2 are wound around the drum 11 at the respective ends, and when one of the first and second cables C1, C2 is wound up, the other of the first and second cables C1, C2 is unwounded.

A third cable C3 serving as a rope member one end of which being engaged with the front guide 16 extends in an upwardly rearward direction towards the front pulley 12, is hooked at the front pulley 12 to extend in the downwardly rearward direction towards the rear pulley 15. Then, the third cable C3 is hooked at the rear pulley 15 to extend in the upwardly rearward direction, and the other end of the third cable C3 is engaged with the rear guide 17.

In a case where the first cable C1 is wound up and the second cable C2 is unwound in response to the rotation of the drum 11 in one direction, the front guide 16 connected to the first cable C1 moves downward and the rear guide 17 connected to the front guide 16 via the third cable C3 moves downward. Then, the window pane G whose lower rim portion is fixed to the front guide 16 and the rear guide 17 moves downward.

On the other hand, in a case where the second cable C2 is wound up and the first cable C1 is unwound in response to the rotation of the drum 11 in a reversal direction, the rear guide 17 connected to the second cable C2 moves upward and the front guide 16 connected to the rear guide 17 via the third cable C3 moves upward. Then, the window pane G whose lower rim portion is fixed to the front guide 16 and the rear guide 17 moves upward.

The drum 11 is connected to a drive source (e.g., an electric motor) to be driven, and the cables C1 C2, C3 are wound up and unwound by the rotational actuation by the drive source.

Figure 1:
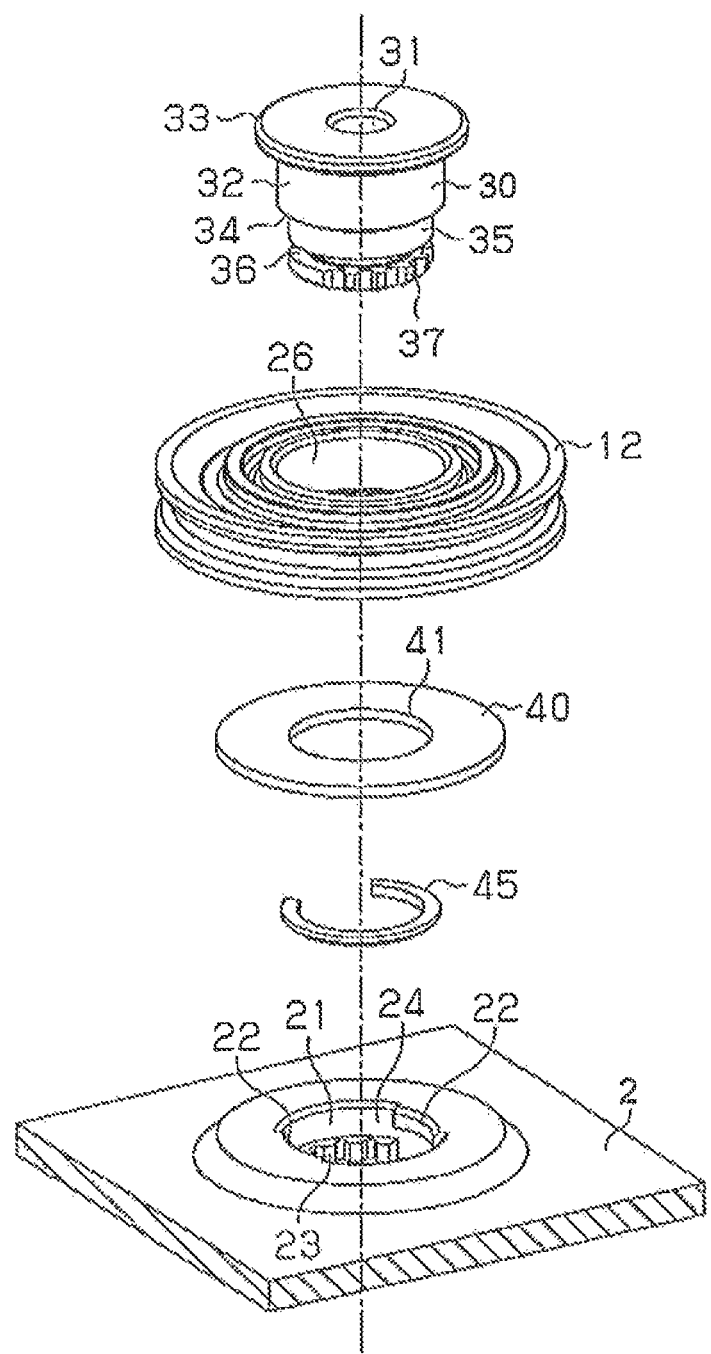
FIG. 1 is an exploded perspective view of a driving apparatus according to an embodiment disclosed here.
Figure 2:
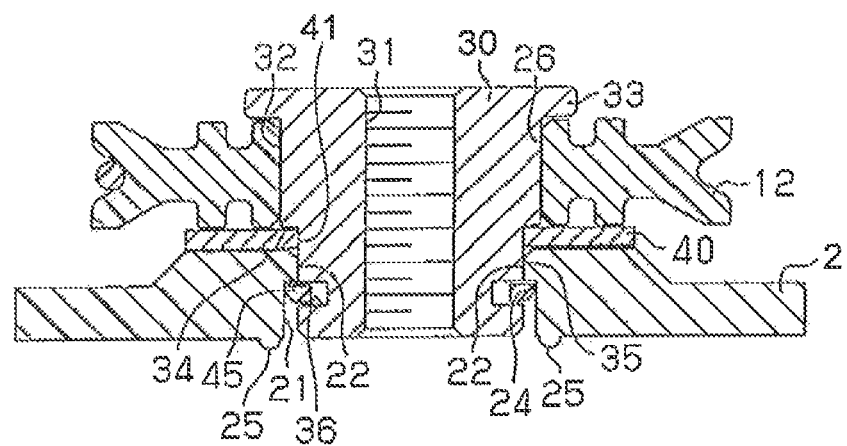
FIG. 2 is a cross-sectional view of the driving apparatus according to the embodiment disclosed here.

Next, an attaching structure of the front pulley 12 and the support member 2 will be explained as follows. As illustrated in FIGS. 1 and 2, the support member 2 is formed with an attachment hole 21 formed in a circular shape and penetrated in an axial direction of the front pulley 12. A pair of inwardly protruding flanges 22 each formed in a sector shape is provided at an opening end portion of the attachment hole 21 at a side facing the front pulley 12 to protrude inwardly. The inwardly protruding flanges 22 are positioned to be opposite to each other in a radial direction. A pair of base side fitting portions 23 is provided at an opening end portion of the attachment hole 21 at a side being away from the front pulley 12. The base side fitting portions 23 are provided to protrude inwardly and are positioned to be opposite to each other in a radial direction. Each of the base side fitting portions 23 includes plural triangular teeth arranged in a circumferential direction. The base side fitting portions 23 are positioned at a range sandwiched by the inwardly protruding flanges 22 in the circumferential direction. That is, the inwardly protruding flanges 22 and the base side fitting portions 23 are positioned to be alternate from one another in the circumferential direction.

The attachment hole 21 forms a circular accommodation portion 24 within a range sandwiched by the inwardly protruding flanges 22 and the base side fitting portions 23. An inner diameter of the accommodation portion 24 is greater than an inner diameter of the inwardly protruding flanges 22 and a diameter of an addendum circle of the base side fitting portion 23 (triangular teeth).

Figure 4:
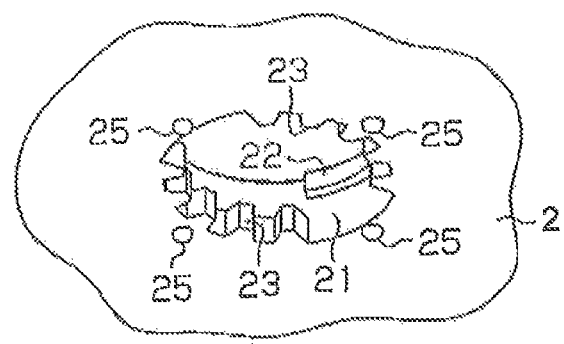
FIG. 4 is a perspective view showing plural projection portions according to the embodiment disclosed here.

Further, as illustrated in FIG. 4, plural (e.g., four) substantially semispherical projection portions 25 are formed at an end surface of the support member 2 at the side being away from the front pulley 12. The projection portions 25 are formed equally spaced (e.g., 90 degrees) from each other along a peripheral rim portion of the attachment hole 21.

As illustrated in FIGS. 1 and 2, as circular insertion hole 26 is formed at the front pulley 12, for example, made of resin material penetrating therethrough in an axial direction. An inner diameter of the insertion hole 26 is greater than an inner diameter of the attachment hole 21. The front pulley 12 is rotatably supported by a support pin 30 which is, for example, made from metal material and formed in a substantially cylindrical shape with steps. The support pin 30 is inserted through the insertion hole 26 in the axial direction.

That is, the support pin 30 is formed with a threaded hole 31 penetrating along an axial direction thereof. The support pin 30 includes a support portion 32 and a flange 33. The support portion 32 is formed in a substantially cylindrical shape and is formed to have an outer diameter approximately the same size to the inner diameter of the insertion hole 26 and to have a length approximately the same length to the axial length of the insertion hole 26. The flange 33 is provided at an end of the support pin 30 of the support portion 32 at a side being away from the support member 2 in the axial direction when assembled. The flange 33 is provided to protrude in a radially outer direction. Thus, the support pin 30 inserted to be positioned in the insertion hole 26 rotatably supports the pulley 12 at the support portion 32 and checks, or stops the front pulley 12 from moving in one direction in the axial direction (i.e., the direction being away from the support member 2) at the flange 33.

An end portion of the support pin 30 that penetrates the front pulley 12 forms a substantially cylindrical attachment portion 35 having a reduced diameter via an annular stepped portion 34. An outer diameter of the attachment portion 35 is approximately the same size to an inner diameter of the inwardly protruding flange 22. A circumferential groove 36 formed in an annular shape is formed at a center portion of the attachment portion 35 in an axial direction. A pair of pin side fitting portions 37 which are positioned to be opposite to each other in a radial direction are formed as recesses at a portion closer to an end side than the circumferential groove 36 of the attachment portion 35 in the axial direction. Each of the pin side fitting portions 37 is formed to have plural triangular teeth arranged in a circumferential direction. The pin side fitting portions 37 are positioned to correspond to a range of the base side fitting portions 23 of the support member 2 in the circumferential direction.

The attachment portion 35 of the support pin 30 is inserted through a restriction member 40 formed in a substantially annular shape and is made from, for example, metal member. An outer diameter of the restriction member 40 is greater than the inner diameter of the insertion hole 26 and an inner diameter of the restriction member 40 is approximately the same size to an outer diameter of the attachment portion 35. That is, the restriction member 40 includes an insertion hole 41 through which the attachment portion 35 of the support pin 30 is inserted. Accordingly, the restriction member 40 is restricted by the stepped portion 34 from moving axially in a direction to be closer to the flange 33.

A C-ring 45 serving as an annular elastic member, for example, made from resin member is fitted into the circumferential groove 36 of the attachment portion 35 that is inserted through the restriction member 40. The C-ring 45 is fitted to the circumferential groove 36 so that a direction of the elastic deformation of the C-ring 45 is limited only in a radial direction. That is, the C-ring 45 is supported so as to be able to reduce the diameter in the radial direction relative to the circumferential groove 36. In a state where the C-ring 45 is elastically deformed to have a reduced diameter in the circumferential groove 36, an outer diameter of the C-ring 45 is assumed to be approximately equal to or smaller than the inner diameter of the inwardly protruding flanges 22. In a state where the C-ring 45 is in a free state (natural state) being a state where a shape of the C-ring 45 which is once deformed is returned to an original shape because of elasticity (i.e., hereinafter referred to as elastic recovery, or elastic recovery state), an outer diameter of the C-ring 45 is greater than an outer diameter of the inwardly protruding flanges 22 and an inner diameter of the C-ring 45 is smaller than the outer diameter of the attachment portion 35 and the greater than an inner diameter of the circumferential groove 36. Further, in a state where the C-ring 45 is in a free state (natural state) having the elastic recovery, the outer diameter of the C-ring 45 is greater than an inner diameter of the insertion hole 41 of the restriction member 40.

In those circumstances, the free state (natural state) corresponds to an elastic recovery state of the C-ring 45 where the load applied to the C-ring 45 is removed (i.e., the load is not applied to the C-ring 45). Thus, the restriction member 40 through which the attachment portion 36 of the support pin 30 is inserted is sandwiched between the C-ring 45 fitted into the circumferential groove 36 and the stepped portion 34 so as to be prevented from dislocating or falling out in an axial direction. The front pulley 12 through which the support portion 32 of the support pin 30 is inserted is sandwiched between the restriction member 40 and the flange 33 so as to be prevented from dislocating or falling out in the axial direction. Thus, the front pulley 12, the support pin 30, the restriction member 40, and the C-ring 45 are integrally and temporally assembled as a pulley sub-assembly (sub-assembly). That is the front pulley 12 is configured to be supported by the support pin 30 via the restriction member 40 and the C-ring 45. In those circumstances, the front pulley 12 and the restriction member 40 are movable in the axial direction by an axial distance between the stepped portion 34 and the C-ring 45 excluding a thickness of the restriction member 40. Then, the support pin 30 integrally assembled with, for example, the front pulley 12 is inserted into the attachment hole 21 from the side of the inwardly protruding flange 22 along the axial direction.

Figure 5A:
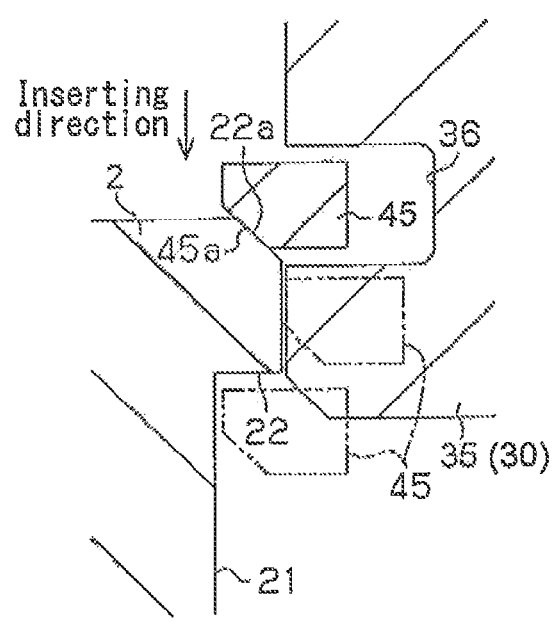
FIG. 5A is a cross-sectional view showing an operation for assembling a C-ring.
Figure 5B:
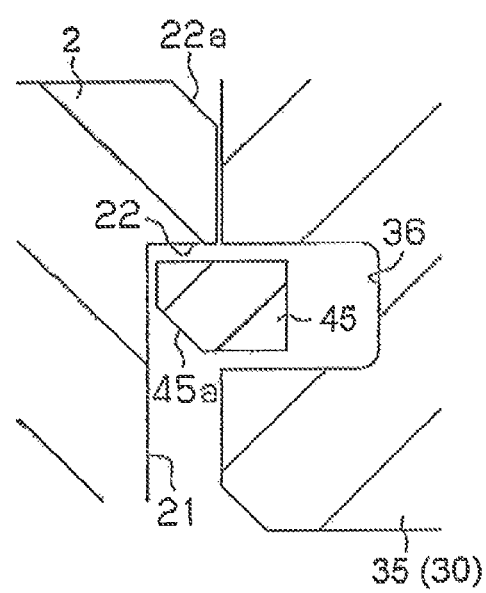
FIG. 5B is a cross-sectional view showing the operation for assembling the C-ring.

As illustrated in FIGS. 5A and 5B, a base side guide portion 22a serving as a guide portion is formed at an inner peripheral rim portion, or an inner circumferential rim portion of the inwardly protruding flanges 22 at a side opposing to an inserting direction of the support pin 30 in the axial direction. The base side guide portion 22a is chamfered to remove a substantially triangular shape in cross-section. A ring side guide portion 45a serving as a guide portion is formed at an outer peripheral rim portion, or an outer circumferential rim portion of the C-ring 45 at a side following the inserting direction of the support pin 30 in the axial direction. The ring side guide portion 45a is chamfered to remove a substantially triangular shape in cross-section. The base side guide portion 22a and the ring side guide portion 45a are positioned so as to impede, or to block moving locus along the axial direction each other in a case where the C-ring 45 is in a free state where the C-ring 45 is in the elastic recovery state.

Thus, when the support pin 30 integrally assembled with, for example, the front pulley 12 is inserted into the attachment hole 21 from the side of the inwardly protruding flange 22 along the axial direction, the C-ring 45 contacts the base side guide portion 22a of the inwardly protruding flange 22 at the ring side guide portion 45a. Then, when the support pin 30 is further inserted into the attachment hole 21 along the axial direction, a relative position of the C-ring 45 and the support member 2 (attachment hole 21) is guided by the base side guide portion 22a and the ring side guide portion 45a, and an elastic deformation of the C-ring 45 reducing a diameter within the circumferential groove 36 is guided. The C-ring 45 passes the base side guide portion 22a while sliding on the inwardly protruding flange 22.

Subsequently, in a case where the support pin 30 is further inserted into the attachment hole 21 along the axial direction, the C-ring 45 is assumed to be the elastic recovery state when reaching the accommodation portion 24 after passing the inwardly protruding flanges 22. Thus, the C-ring 45 is housed in the accommodation portion 24. Accordingly, the C-ring 45 is assumed to be engageable with the inwardly protruding flanges 22, and the support pin 30 integrally assembled with, for example, the front pulley 12 (pulley assembly) is prevented from being falling out, or dislocating from the attachment hole 21.

Figure 3:
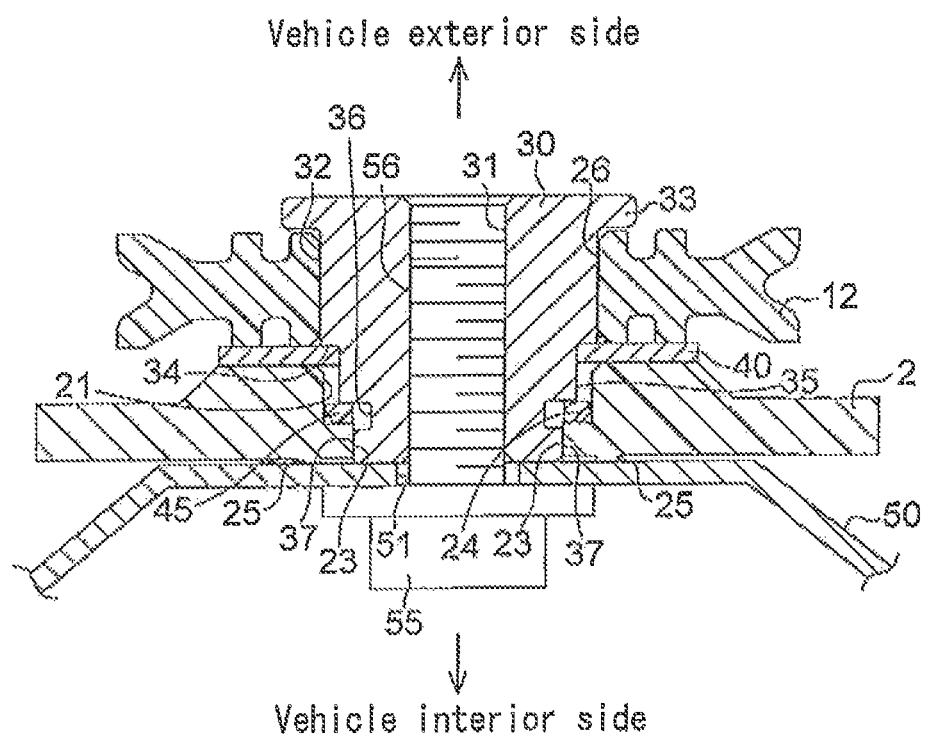
FIG. 3 is a cross-sectional view of the driving apparatus according to the embodiment disclosed here.

As illustrated in FIG. 3, the pin side fitting portions 37 are fitted to the base side fitting portions 23, respectively, so as to be prevented from rotating relative to the support member 2. Further, the restriction member 40 contacts or come to be positioned close to the support member 2 at a peripheral rim portion of the attachment hole 21 to determine the axial position of the front pulley 12 between the flange 33 and the restriction member 40.

Accordingly, the pulley sub assembly including the support pin 30 is assembled to the support member 2 and the front pulley 12 is rotatably supported by the support member 2. The support pin 30 being prevented from falling out, or dislocating from the support member 2 contacts a door panel 50 constituting a vehicle door from outside the vehicle together with the plural projection portions 25 formed on the support member 2. A screw portion 56 of a fastening bolt 55 idly inserted from a vehicle inside into a bolt insertion hole 51 formed at the door panel 50 is fastened at the threaded hole 31 so that the support pin 30 is fixed to the door panel 50 together with the support member 2 and components of the pulley sub assembly. In those circumstances, because the plural projection portions 25 pressed by the door panel 50 are crashed with pressure, a clearance between the door panel 50 and the support member 2 is reduced to be approximately even at the positions of the projection portions 25. That is, the plural projection portions 25 are configured to be crashed by a fastening torque to the door panel 50 by the fastening bolt 55. Thus, a shakiness of the support member 2 and components of the pulley sub assembly relative to the door panel 50 is restrained.

The attaching structure of the front pulley 13, the rear pulleys 14, 15 to the support member 2 is similar to the attaching structure of the front pulley 12 to the support member 2, thus, the explanations will not be repeated. At each of the front pulleys 12, 13 and the rear pulleys 14, 15, the support pin 30 is fastened to the door panel 50 by means of the fastening bolt 55 so that the window regulator apparatus 1 is fixed to the door panel 50. Because each of the support pins 30 is fitted to the base side fitting portion 23 of the support member 2 at the pin side fitting portion 37 so as to be prevented from rotating, the window regulator apparatus 1 can be smoothly attached to the door panel 50 by means of the fastening bolt 55. Similarly, the window regulator apparatus 1 can be smoothly removed from the door panel 50.

Operation of the drive apparatus for the vehicle according to the embodiment will be explained hereinafter. In the assembling process, the support pin 30 is inserted through, for example, the front pulley 12 along the axial direction thereof, and the support pin 30 is inserted through the restriction member 40. Subsequently, the C-ring 45 is pressed onto the support pin 30 along the axial direction of the support pin 30 while being elastically deformed so that the C-ring 45 reaches the circumferential groove 36 to be fitted into the circumferential groove 36 where the diameter of the C-ring 45 expands. Accordingly, the front pulley 12 is supported by the support pin 30 by means of the C-ring 45. Further, the front pulley 12, the support pin 30, the restriction member 40, and the C-ring 45 are temporarily and integrally assembled.

In the foregoing state, when the support pin 30 is inserted to the attachment hole 21 of the support member 2 from the side of the inwardly protruding flange 22 along the axial direction of the support pin 30, the C-ring 45 is elastically deformed to reduce the diameter within the circumferential groove 35 to pass the flange 22, and is assumed to be the elastic recovery state to regain the original diameter (expand the diameter) in response to passing through the inwardly protruding flange 22. Thus, the C-ring 45 engaged with the inwardly protruding flanges 22 prevents the support pin 30 from being dislocated, or falling out, and the front pulley 12 is rotatably assembled between the restriction member 40 (support member 2) and the flange 33. The front pulley 13, the rear pulleys 14, 15 are similarly constructed. As explained above, because the drive apparatus is obtained by sequentially assembling the support pin 30 end other components along the axial direction, only one assembling direction exists according to the disclosure.

According to the embodiment, the following effects and advantages can be attained. First, when assembling the pulleys 12 to 15 to the support member 2 to be rotatable, the pulleys 12 to 15 can be assembled in one direction (single assembling direction exists), and thus the assembly time can be reduced.

Second, according to the embodiment, the support pin 30 includes the stepped portion 34 reducing a diameter of the end portion (attachment portion 35) that penetrates through the pulley 12, 13, 14, 15. The stepped portion 34 contacts the restriction member 40 (support member 2 side) in the axial direction to stop, or check the movement of the support pin 30. Thus, a distance between the restriction member 40 (support member 2) and the flange 33 does not become shorter than the distance between the restriction member 40 and the flange 33 in state where the stepped portion 34 is in contact with the restriction member 40. Thus, even if a force for reducing the distance between the support member 2 and the flange 33 is applied, the distance between the support member 2 and the flange 33 is restrained from being reduced. That is, space necessary for pulley sliding portion (space necessary for sliding the pulley) can be ensured, and the disturbance of the rotation of, for example, the pulley 12, 13, 14, 15 about the support pin 30 (support portion 32) because of the compression of the pulley 12, 13, 14, 15 by the flange 33 and the restriction member 40 in the axial direction can be restrained.

As described above, the window regulator apparatus 1 is fixed to the door panel 50 by fastening the fastening bolt 55 to each of the support pins 30. Thus, an axial force by the fastening bolt 55 is an example of a force for reducing the distance between the support member 2 and the flange 33.

Third, according to the embodiment, the stepped portion 34 contacts the restriction member 40 through which the end portion (attachment portion 35) of the support pin 30 whose diameter is reduced is inserted to stop the movement of the support pin 30. In those circumstances, because the restriction member 40 is independently provided from the support member 2, the stepped portion 34 is adjustable without being restricted by, for example, the attachment hole 21. Thus, degree of freedom of the configuration of, for example, the C-ring 45 and the inwardly protruding flange 22 that engages with the C-ring 45 can be enhanced.

Fourth, according to the construction of the embodiment, when inserting the pulley sub-assembly including the support pin 30 into the attachment hole 21 from the side of the inwardly protruding flange 22, because the elastic deformation of the C-ring 45 to reduce the diameter thereof is guided by the base side guide portion 22a and the ring side guide portion 45a when the C-ring 45 passes through the inwardly protruding flange 22, the C-ring 45 can pass through the inwardly protruding flange 22 more smoothly.

Particularly, the elastic deformation of the C-ring 45 to reduce the diameter thereof can be more securely guided by a cooperation of the base side guide portion 22a and the ring side guide portion 45a.

Fifth, according to the embodiment, because the window regulator apparatus 1 is fastened to the door panel 50 in a state where all of the pulleys 12 to 15 as pulley sub assemblies are pre-supported by the support member 2, the assembling performance, or assembility can be enhanced.

Sixth, according to the embodiment, by providing the metal made restriction member 40 serving as a sliding seat of the pulley 12, 13, 14, 15 between the resin made support member 2 and the pulley 12, 13, 14, 15, for example, an abrasion of the support member 2 or the pulley 12, 13, 14, 15 in response to the rotation of the pulley 12, 13, 14, 15 can be restrained compared to a construction in which resin members contact one another.

Seventh, according to the embodiment, when fastening the window regulator apparatus 1 to the door panel 50 by means of the fastening bolt 55, because the plural projection portions 25 are crashed with pressure at the periphery rim portion of the attachment hole 21, the shakiness generated because of dimensional variation of parts can be restrained. Further, the generation of the noise because of the oscillation, or vibration can be restrained.

Eighth, according to the embodiment, because the pulley 12, 13, 14, 15 is configured to be supported by the support pin 30 via the restriction member 40 and the C-ring 45, the support pin 30, the pulley 12, 13, 14, 15, and the C-ring 45 can be formed as a sub-assembly via the restriction member 40.

The construction of the embodiment may be changed as follows. According to an alternative construction of the embodiment, one of the base side guide portion 22e and the ring side guide portion 45a may be omitted. Further, according to an alternative construction of the embodiment, both of the base side guide portion 22a and the ring side guide portion 45a may be omitted.

According to an alternative construction of the embodiment, the restriction member 40 may be omitted and the stepped portion 34 of the support pin 30 may directly contact the peripheral rim portion of the attachment hole 21 of the support member 2 (inwardly protruding flange 22). In this construction, in addition to engaging function engaging with the C-ring 45 which is in an elastic recovery state, the peripheral rim portion of the attachment hole 21 (inwardly protruding flange 22) includes a function for ensuring the space necessary for the pulley sliding portion (space necessary for sliding the pulley) by ensuring a distance between the support member 2 and the flange 33.

According to an alternative construction of the embodiment, the stepped portion 34 of the support pin 30 may be omitted. Further, according to an alternative construction, a flange (33) of the support pin 30 may be formed only at a part in a circumferential direction.

According to an alternative construction of the embodiment, an O-ring may be adopted in place of the C-ring 45. Further, according to an alternative construction of the embodiment, a substantially annular inwardly protruding flange which is protruding provided at the attachment hole 21 may be adopted.

According to an alternative construction of the embodiment, the fitting of the base side fitting portion 23 and the pin side fitting portion 37 may be performed either with pressure (i.e., press-fitting) or without pressure. According to an alternative construction of the disclosure, the fitting of the attachment hole 21 (base side fitting portion) and the attachment portion 35 (pin side fitting portion) may be performed via spline, or via polygonal shaped fitting portions.

According to an alternative construction of the embodiment, fitting structures of the attachment hole 21 (base side fitting portion) and the attachment portion 35 (pin side fitting portion) may be omitted. According to an alternative construction of the embodiment, the cables C1, C2, C3 may be formed as a single cable. In this construction, a single guide or plural guides (16, 17) may be provided to be fixed to and to support the window pane G.

According to an alternative construction of the embodiment, in place of the drum 11, the pulleys 12 to 15, and the cables C1 to C3, a driving gear, a driven gear, and a teethed belt which is meshed with the driving gear and the driven gear may be adopted. In this construction, the teethed belt may be structured with a single string of teethed belt or with plural teethed belts. A single guide or plural guides (16, 17) to be fixed to or to support the window pane G may be provided.

According to an alternative construction of the embodiment, in place of the drum 11, the pulleys 12 to 15, and the cables C1 to C3, a driving chain gear, a driven chain gear, and a chain hooked on the driving chain gear and the driven chain gear may be adopted. In this construction, the chain may be constructed with a single chain or plural chains. A single guide or plural guides (16, 17) to be fixed to or to support the window pane G may be provided.

According to an alternative construction of the embodiment, the pulleys 12 to 15 may be made from material other than the resin. For example, the pulleys 12 to 15 may be made from metal material. According to an alternative construction of the embodiment, the support pin 30 may be made from material other than metal material. For example, the support pin 30 may be made from resin materiel.

According to an alternative construction of the embodiment, the restriction member 40 may be made from material other than metal material. For example, the restriction member 40 may be made from resin material. According to an alternative construction of the embodiment, the C-ring 45 may be made from material other than resin material. For example, the C-ring 45 may be made from metal material.

According to the construction of the embodiment, any number of the projection portions 25 provided at the peripheral rim portion of each of the attachment hole 21 of the support member 2 is applicable as long as being equal to or greater than three (3). According to an alternative construction of the embodiment, all of the plural projection portions 25 may be omitted. The construction according to the disclosure may be applied to an assembling structure of a rotation member (e.g., pulley) which is associated with an opening and closing actuation of, for example, a vehicle door (e.g., swing door, slide door, backdoor) and a support member supporting the rotation member. Alternatively, the construction according to the disclosure may be applied to an assembling structure of a rotation member (e.g., pulley) which is associated with an opening and closing actuation of a movable panel which is mounted to a roof portion of a vehicle and a support member supporting the rotation member. Alternatively, the construction according to the disclosure may be applied to an assembling structure of a rotation member (e.g., pulley) which is associated with an actuation of a power seat and an exterior components, for example, a movable grille shutter and a movable spoiler, and a support member supporting the rotation member.

According to the embodiment, a window regulator apparatus includes a guide member connected to the rope member and fixing and supporting the window pane, and the driving apparatus for the vehicle.

According to the construction of the embodiment, the driving apparatus (e.g., window regulator apparatus 1) for the vehicle includes the rotation member (pulley 12, 13, 14, 15) on which the rope member (cable C1, C2, C3) for transmitting a driving force of a drive source is hooked, the support pin (30) being inserted into the rotation member (pulley 12, 13, 14, 15) along an axial direction of the rotation member (pulley 12, 13, 14, 15), including the flange (33) for stopping a movement of the rotation member (pulley 12, 13, 14, 15) in one direction in the axial direction, including the circumferential groove (36) formed at an end portion that penetrates through the rotation member (pulley 12, 13, 14, 15), the support pin (30) rotatably supporting the rotation member (pulley 12, 13, 14, 15), the annular elastic member (C-ring 45) supported relative to the circumferential groove (36), the annular elastic member (C-ring 45) configured to reduce a diameter in a radial direction, and the support member (2) including an attachment hole (21) in which the end portion of the support pin (30) that penetrates through the rotation member (pulley 12, 13, 14, 15) is idly provided, the support member (2) including the inwardly protruding flange (22) provided at the attaching hole (21) to protrude at a position closer to the flange (33) than the annular elastic member (C-ring 45) in an axial direction, the inwardly protruding flange (22) having an inner diameter equal to or greater than an outer diameter of the annular elastic member (C-ring 45) when the annular elastic member (C-ring 45) is in an elastically deformed state having reduced diameter within the circumferential groove (36) and smaller than the outer diameter of the annular elastic member (C-ring 45) when the annular elastic member (C-ring 45) is in an elastic recovery state where the diameter expands.

According to the construction of the disclosure, in an assembling process, the support pin (30) is inserted, for example, through the rotation member (pulley 12, 13, 14, 15) along the axial direction of the rotation member (pulley 12, 13, 14, 15). Consecutively, by attaching the annular elastic member (C-ring 45) to the circumferential groove (36) of the support pin (30), the rotation member (pulley 12, 13, 14, 15) is directly or indirectly supported by the annular elastic member (C-ring 45) relative to the support pin (30). Upon an insertion of the support pin (30) along the axial direction of the support pin (30) into the attachment hole (21) from the side of the inwardly protruding flange (22), the annular elastic member (C-ring 45) passes the inwardly protruding flange (22) while being elastically deformed to reduce the diameter in the circumferential groove (36) and is assumed to have the elastic recovery to expand the diameter in response to passing through the inwardly protruding flange (22). Thus, the support pin (30) is prevented from being pulled out in the axial direction by means of the annular elastic member (C-ring 45) that engages with the inwardly protruding flange (22), and the rotation member (pulley 12, 13, 14, 15) is rotatably assembled between the support member (2) and the flange (33). Accordingly, because the driving apparatus can be assembled by assembling components, for example, the support pin (30) along the axial direction consecutively, the assembling direction is assumed to be from one direction, and the assembly time can be further reduced.

According to the construction of the embodiment, the driving apparatus for the vehicle further includes the stepped portion (34) that reduces a diameter of the end portion of the support pin (30) that penetrates through the rotation member (pulley 12, 13, 14, 15). The stepped portion (34) contacts a support member side in the axial direction to stop the movement of the support pin (34).

According to the construction of the disclosure, a distance between the support member (2) and the flange (33) in an axial direction does not come to be shorter than the distance between the support member (2) and the flange (33) in the axial direction in a state where the stepped portion (34) is in contact with the support member (2) side. Thus, even if a force to shorten the distance between the support member (2) and the flange (33) is applied, the distance is restrained from being shortened, and for example, the rotation of the rotation member (pulley 12, 13, 14, 15) about the support pin (30) is restrained from being disturbed, or interfered because the rotation member (pulley 12, 13, 14, 15) is restrained from being compressed in the axial direction by, for example, the flange (33).

According to the construction of the embodiment, the stepped portion (34) contacts a restriction member (40), through which the end portion of the support pin (30) with the reduced diameter is inserted, to stop the movement of the support pin (30).

According to the construction of the disclosure, because the restriction member (40) is provided independently from the support member (2), the stepped portion (34) can be adjusted without the restriction by, for example, the attachment hole (21). Accordingly, a degree of freedom for the configuration of, for example, the annular elastic member (C-ring 45) and the inwardly protruding flange (22) that engages with the annular elastic member (C-ring 45) can be enhanced.

According to the construction of the embodiment, the restriction member (40) includes the insertion hole (41) through which the end portion of the support pin (30) with the reduced diameter is inserted, the inner diameter of the insertion hole (41) is set to be smaller than the outer diameter of the annular elastic member (C-ring 45) in a natural state, and the rotation member (pulley 12, 13, 14, 15) is configured to be supported by the support pin (30) via the restriction member (40) and the annular elastic member (C-ring 45).

According to the construction of the disclosure, the support pin (30), the rotation member (pulley 12, 13, 14, 15), and the annular elastic member (C-ring 45) can be formed as a sub-assembly via the restriction member (40).

The driving apparatus for the vehicle further includes the guide portion (22*a*, 45*a*) formed at at least one of an inner peripheral rim portion of the inwardly protruding flange (22) opposing to an inserting direction of the support pin (30) and an outer peripheral rim portion of the annular elastic member (C-ring 45) opposing to a direction reversal from the inserting direction of the support pin (30), the guide portion (22*a*, 45*a*) guiding an elastic deformation of the annular elastic member (C-ring 45) whose diameter reduces when the annular elastic member (C-ring 45) passes through the inwardly protruding flange (22).

According to the construction of the disclosure, when inserting, for example, the support pin (30) into the attachment hole (21) from the side of the inwardly protruding flange (22), because the elastic deformation of the annular elastic member (pulley 12, 13, 14, 15) at which the diameter of the elastic member (pulley 12, 13, 14, 15) reduces is guided by the guide portion (22*a*, 45*a*) when the annular elastic member (pulley 12, 13, 14, 15) passes the inwardly protruding flange (22), the annular elastic member (C-ring 45) can pass the inwardly protruding flange (22) more smoothly.

According to the construction of the disclosure, the assembly time can be reduced by making the assembling direction in one direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving apparatus for a vehicle, comprising:
   a rotation member on which a rope member for transmitting a driving force of a drive source is hooked;
   a support pin being inserted into the rotation member along an axial direction of the rotation member, including a flange for stopping a movement of the rotation member in one direction in the axial direction, including a circumferential groove formed at an end portion that penetrates through the rotation member, the support pin rotatably supporting the rotation member;
   an annular elastic member supported relative to the circumferential groove, the annular elastic member configured to reduce a diameter in a radial direction; and
   a support member including an attachment hole in which the end portion of the support pin that penetrates through the rotation member is idly provided, the support member including an inwardly protruding flange provided at the attachment hole to protrude at a position closer to the flange than the annular elastic member in an axial direction, the inwardly protruding flange having an inner diameter equal to or greater than an outer diameter of the annular elastic member when the annular elastic member is in an elastically deformed state having reduced diameter within the circumferential groove and smaller than the outer diameter of the annular elastic member when the annular elastic member is in an elastic recovery state where the diameter expands.

2. The driving apparatus for the vehicle according to claim 1, further comprising:

a stepped portion that reduces a diameter of the end portion of the support pin that penetrates through the rotation member; wherein the stepped portion contacts a support member side in the axial direction to stop the movement of the support pin.

3. The driving apparatus for the vehicle according to claim 2, wherein the stepped portion contacts a restriction member, through which the end portion of the support pin with the reduced diameter is inserted, to stop the movement of the support pin.

4. The driving apparatus for the vehicle according to claim 3, wherein the restriction member includes an insertion hole through which the end portion of the support pin with the reduced diameter is inserted, an inner diameter of the insertion hole is set to be smaller than the outer diameter of the annular elastic member in a natural state, and the rotation member is configured to be supported by the support pin via the restriction member and the annular elastic member.

5. The driving apparatus for the vehicle according to claim 1, further comprising:

a guide portion formed at at least one of an inner peripheral rim portion of the inwardly protruding flange opposing to an inserting direction of the support pin and en outer peripheral rim portion of the annular elastic member opposing to a direction reversal from the inserting direction of the support pin, the guide portion guiding an elastic deformation of the annular elastic member whose diameter reduces when the annular elastic member passes through the inwardly protruding flange.

* * * * *